Aug. 7, 1962 M. ARES 3,048,794
MICROWAVE AMPLIFYING SYSTEM
Filed Dec. 23, 1959 2 Sheets-Sheet 1

POWER DENSITY VERSUS FREQUENCY

Inventor:
Manuel Ares,
by Allen E. Amgott
His Attorney.

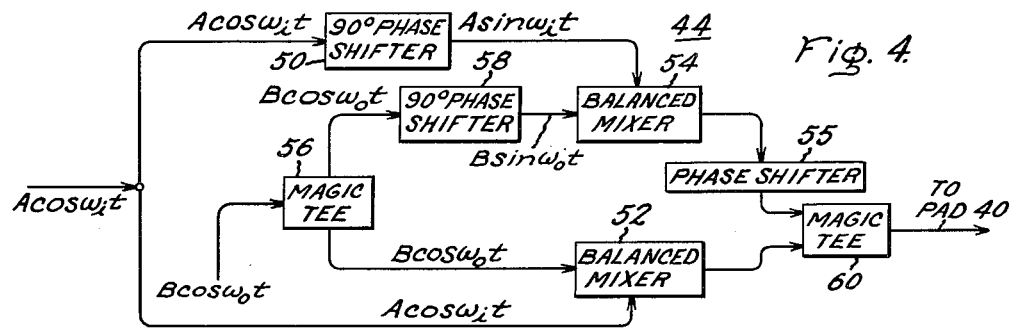
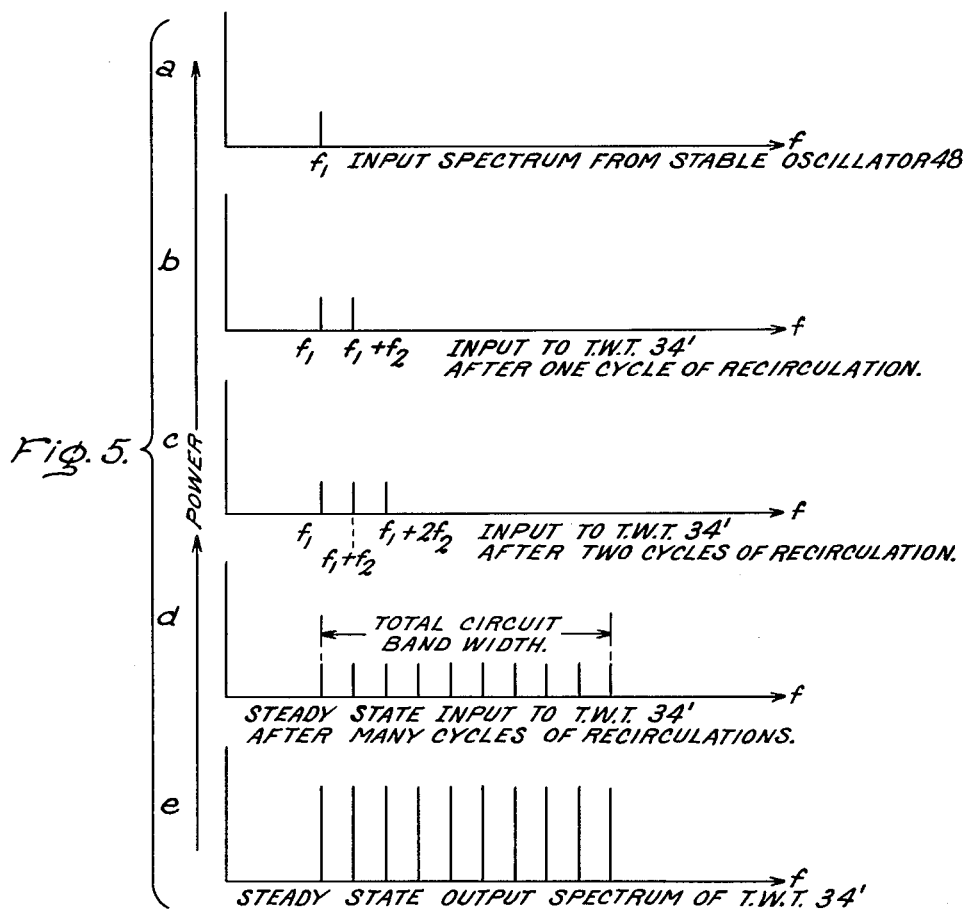

United States Patent Office 3,048,794
Patented Aug. 7, 1962

3,048,794
MICROWAVE AMPLIFYING SYSTEM
Manuel Ares, Ithaca, N.Y., assignor to General Electric Company, a corporation of New York
Filed Dec. 23, 1959, Ser. No. 861,712
3 Claims. (Cl. 331—78)

The present invention relates generally to microwave amplifiers and more particularly to broad band noise generating and amplifying systems.

During the past decade great strides have been made in perfecting radar systems for use both on the ground and in manned and unmanned space vehicles. With the increasing amount of electronic equipments that are being utilized in space vehicles, it is exceedingly important that radar systems to be installed thereon are compact and light in weight but do not sacrifice accuracy and range capability. In advanced type radar systems presently under development, such as pulse Doppler radar tracking systems which are rapidly tunable for producing successive transmitted pulses of different frequency, it has been necessary to provide circuits that can generate successive, discrete, phase coherent, microwave signals. In addition, it is extremely desirable in the microwave art to be able to generate high power signals having a wide frequency band. Such signals are desirable for use in electronic countermeasures equipments that generate and transmit signals for the purpose of minimizing the effectiveness of unfriendly transmissions.

In the past several methods of generating high power, broad band, microwave signals have been developed. One such method includes the use of a chain of travelling wave tubes (TWT) amplifiers. Noise, such as thermal or microwave frequency electronic noise, developed in the travelling wave tube is amplified by a chain of travelling wave tubes to produce high power, broad band microwave signals. In order to generate satisfactory signals, a plurality of travelling wave tubes are required to amplify the signal to a high enough level to achieve effective jamming at desired ranges. Because these tubes are heavy and expensive, the use of a plurality of travelling wave tubes in manned and unmanned space vehicles, where space limitations and weight restrictions are imposed, make their use unsuitable.

Another method that has been developed to generate high level, broad band microwave signals involves the use of swept-voltage, tunable oscillators, such as carcinotrons and voltage tunable magnetrons. However, with the present state of the art, the sweep rates required to produce signals having the desired characteristics of thermal noise for jamming purposes utilizing carcinotrons or voltage tunable magnetrons are extremely difficult to obtain. Thus, a plurality of oscillators are required to generate the desired signals. The use of a plurality of oscillators results in excessive weight and cost of the system in which they are incorporated.

One object of the present invention is to provide a high level, wide band microwave amplifier that is lighter in weight than those heretofore mentioned.

Another object of this invention is to provide means for generating high level, wide band, microwave frequency energy signals.

A further object of the invention is to provide means for producing high level, wide band microwave power.

Still another object of the invention is to provide means for producing high level, discrete frequency signals that are separated by constant frequency increments having phase coherence.

A still further object is to provide a microwave amplifier frequency power spectrum expander.

Other objects and many of the attendant advantages of the invention will be readily appreciated as the same becomes better understood with reference to the following detailed description when considered in connection with the accompanying drawings wherein:

FIGURE 1 illustrates in block diagram form one embodiment of this invention;

FIGURES 2a, 2b, 2c, and 2d represent illustrative plots of power diversity vs. frequency produced in the invention of FIG. 1;

FIGURE 4 illustrates in block diagram form the frequency offset generator included in the embodiment of FIG. 3; and FIGURES 5a, 5b, 5c, 5d, and 5e represent plots of power vs. frequency generated in the embodiment illustrated in FIG. 3.

In brief, the present invention comprises a system for generating wide band microwave signals from a narrow band signal source. The narrow band input is amplified and shifted in frequency. A portion of the frequency shifted output signal is fed back to the input where it is added to the narrow band input signal. The sum signal again undergoes a shift in frequency. This process is repeated many times until the output power spectrum is much wider than that of the input signal.

In one embodiment of the present invention the amplification and frequency shift is accomplished in a travelling wave tube which has sawtooth helix modulation. The output signal from the TWT is an amplification of the input signal with its frequency shifted by an amount equal to the modulation frequency on the helix of the TWT. Thus, the output of the system is actually a plurality of signals spaced from each other by a frequency equal to the modulation frequency and the sum of these signals appears as a signal of constant amplitude over the entire frequency range of the TWT. In an alternative embodiment of the invention, microwave circuitry is provided for accepting and amplifying a microwave discrete frequency voltage signal and producing a plurality of high level, discrete, separate frequencies which are separated by fixed (constant) frequency increments.

Figure 1:
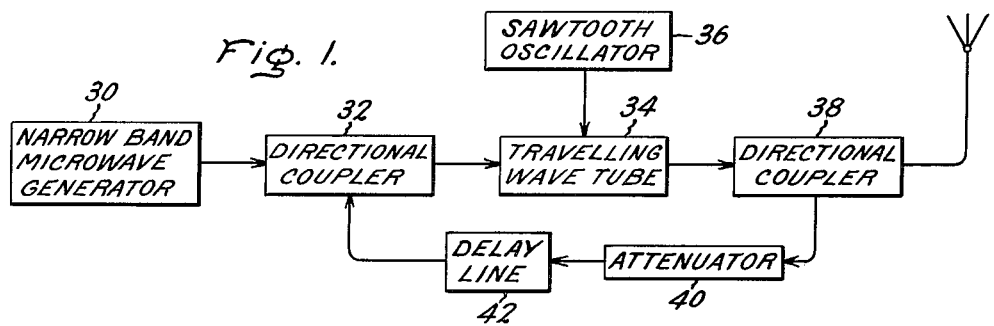
Figure 2:
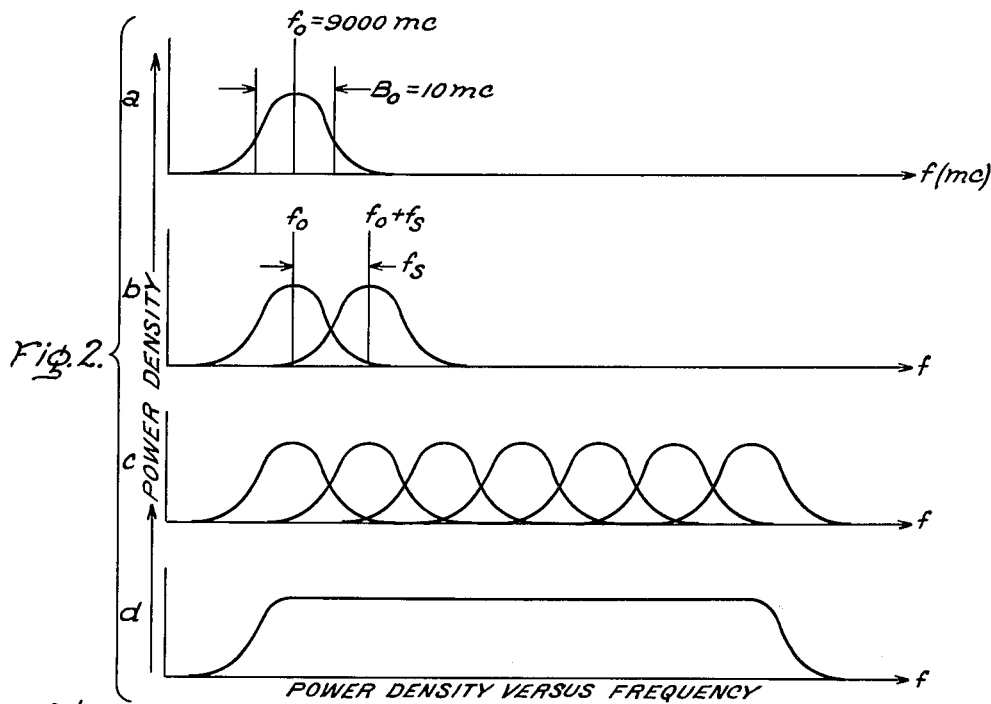

Turning now to the drawings, and more particularly to FIG. 1, there is shown in block diagram form one embodiment of the invention capable of producing high level, wide band output signals at microwave frequencies. To better appreciate the invention reference will be made to FIG. 2 in the discussion which follows. As shown in FIG. 1, there is included means in the form of a conventional microwave generator 30 that is capable of producing a narrow band output signal in the microwave frequency region. Generator 30 may be a noisy klystron or magnetron. A typical output density power spectrum from generator 30 is shown in FIG. 2a. This spectrum has a center frequency $f_0$ and a bandwidth $B_0$. For discussion purposes only it is assumed that the center frequency $f_0$ is approximately 9000 mc. and that the bandwidth $B_0$ is of the order of 10 mc. The output signal from generator 30 is fed through conventional microwave plumbing (waveguide) to a coupler 32 of the directional type. Directional couplers are conventional devices employed in the microwave art. The signal from directional coupler 32 is fed through microwave plumbing to a TWT 34 which includes means for amplifying and shifting the frequency of the signal. Travelling wave tubes are well known in the art and generally include an evacuated envelope, a cathode, a control grid, a signal input coupling, a helical electrode, a signal output coupling, and an anode. The output signal from microwave generator 30 is fed through microwave plumbing to directional coupler 32 and then through microwave plumbing to the signal input coupling of travelling wave tube 34.

Connected to the helical electrode of travelling wave tube 34 is a sawtooth oscillator 36 of conventional design. The repetition frequency $f_s$ of the sawtooth oscillator, for illustration purposes, is assumed to be in the neighborhood of 10 mc. and is applied to the helix electrode of travelling wave tube 34 to modulate the signal from coupler 32. As illustrated, travelling wave tube 34 to which is applied microwave input voltage signal $f_o$ and sawtooth voltage signal $f_s$ is, in essence, a serrodyne frequency translator, such as that described in an article entitled "The Serrodyne Frequency Translator," by Raymond C. Cumming, Proceedings of the IRE, February 1957, on pages 175–186. A serrodyne frequency translator accepts an input signal, amplifies it, shifts the frequency of the signal an amount equal to the reciprocal of the period or repetition frequency of the sawtooth signal applied thereto, and produces an amplified output voltage (power) at a new frequency. Thus, the output of travelling wave tube 34 has a center frequency equal to $f_o+f_s$ and a bandwidth of $B_0$. The output power density spectrum of TWT 34, utilizing the microwave frequencies mentioned hereinbefore, will be centered at a frequency of 9010 mc. The output frequency $f_o+f_s$ from travelling wave tube 34 is fed through conventional microwave coupling to a second directional device, directional coupler 38, and then to a load circuit, for example, an antenna. Directional coupler 38 is similar to directional coupler 32 but is designed for the passage of higher frequencies than that of directional coupler 32.

Recirculating or feedback means in the form of an adjustable attenuator or pad 40 and a delay line 42 coupled to directional couplers 38 and 32 is used to apply a portion of the output signal from directional coupler 38 to the input of travelling wave tube 34. Delay line 42 may be any of several types of well-known delay lines utilized in the microwave art. In one embodiment, delay line 42 comprises a coiled wave guide delay line. A portion of the amplified output signal from directional coupler 38 is attenuated in pad 40 and then applied to delay line 42 for delay before being fed to directional coupler 32.

In operation, directional coupler 32 accepts the output signal from generator 30 and the frequency shifted and delayed signal from delay line 42. Both of these signals are then applied to the input coupling of travelling wave tube 34. The form of this signal is illustrated in FIG. 2b. As seen in FIG. 2b the signal comprises two signals, one having a center frequency $f_0$ and a bandwidth $B_0$, and the other signal having a center frequency $f_0+f_s$ and a bandwidth of $B_0$. Travelling wave tube 34 (acting as a serrodyne frequency translator) shifts the frequency of the signals applied thereto and provides a new output signal. Again a portion of the output signal from travelling wave tube 34 is recirculated through the feedback loop including pad 40 and delay line 42 with the result that the new input signal to traveling wave tube 34 is then comprised of three signals, each having a bandwidth of $B_0$, one having a center frequency of $f_0$, another a center frequency of $f_0+f_s$, and still another having a center frequency of $f_0+2f_s$.

It will be obvious to those skilled in the microwave art that the input signals to travelling wave tube 34, hereinbefore described, are actually inputs under transient conditions. After many cycles of recirculation (amplification, frequency shift, feedback, and delay) the input signals to travelling wave tube 34 would be in a steady-state condition and would appear as shown in FIG. 2c. This steady-state output signal of travelling wave tube 34 is coupled to a load circuit, such as, an antenna or other utilization device by directional coupler 38. The resultant power density spectrum of the output from TWT 34, after the initial transient conditions described hereinbefore, would appear as shown in FIG. 2d. A representative output frequency would be 9200 mc. with a bandwith of 200 mc.

Figure 3:
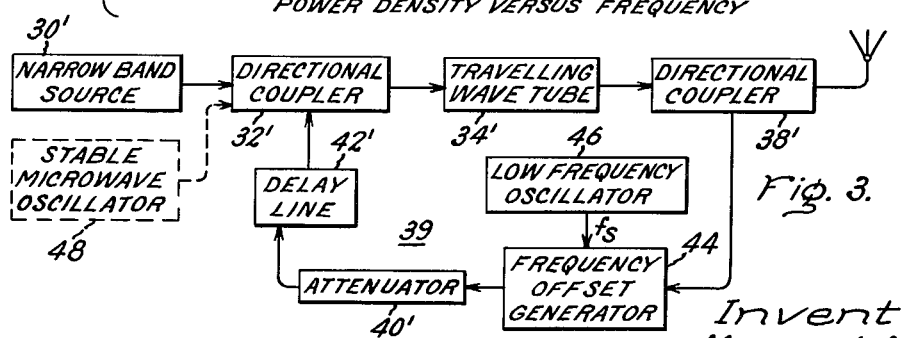
FIGURE 3 illustrates in block diagram form an alternative embodiment of this invention of FIGURE 1.

In FIG. 3 there is an alternative embodiment of the invention. As shown, there is included a narrow band microwave generator 30', a directional coupler 32', a travelling wave tube 34', a directional coupler 38', and a feedback or recirculation loop 39. The output signal from narrow band generator 30' is applied to the travelling wave tube 34' through directional coupler 32' and is amplified therein. The output of travelling wave tube 34' is applied to directional coupler 38' for application to a load circuit such as an antenna. As described with regard to FIG. 1, a portion of the output signal from travelling wave tube 34' is recirculated to the input of travelling wave tube 34' by means of feedback loop 39 in which the signal is shifted in frequency, attenuated and delayed in the manner somewhat similar to that disclosed with regard to FIG. 1. However, in the embodiment of FIG. 3 the frequency shift is obtained other than by means of modulating the helix electrode of travelling wave tube 34'. Instead of using a sawtooth helix modulation of the travelling wave tube to effect the frequency shift, a frequency offset generator 44 (FOG) is utilized to frequency shift the signal.

The basic principles of the FOG are presented in an article entitled "The Phase Shift Method of Single-Sideband Signal Generation," by D. E. Norgaard, appearing in the Proceeding of the IRE, vol. 44, No. 12, pages 1718–1735, December 1956. In FIG. 4 there is shown an embodiment of the FOG generator in block diagram form.

As seen in FIG. 4, a low frequency input signal (shifting signal) which is represented by $A$ cosine $\omega_1 t$, where $\omega_1$ is the angular frequency of the signal and A is its amplitude, is applied directly to a conventional 90° phase shifter 50 as well as directly to a balanced mixer 52. In a microwave embodiment, mixer 52 comprises a crystal mixer including a pair of diodes. Phase shifter 50 operates on the input signal to produce a signal having phase lag of 90° such that the output from phase shifter 50 is represented by $A \sin \omega_1 t$. The output signal from phase shifter 50 is applied directly to a balanced mixer 54 which is identical to balanced mixer 52.

A microwave input signal which has an angular frequency of $\omega_0$, is also applied to frequency offset generator 44. This microwave signal, which is represented by $B \cos \omega_0 t$ with B as the amplitude, is applied to a magic tee 56. Magic tee's are well-known in the microwave art and provide the function of dividing the power applied thereto. Magic tee 56 accepts the microwave signal $B \cos \omega_0 t$ and divides it equally providing two output power signals, one of which is fed directly to a 90° phase shifter 58 and the other of which is fed to balanced mixer 52. In a practical microwave embodiment, magic tee 56 and phase shifter 58 may be replaced by a short-slot hybrid device, such as disclosed in an article entitled "The Short-Slot Hybrid Junction" by H. J. Riblet, Proceedings of the IRE, vol. 40, pages 180–184, February 1952. Phase shifter 58 accepts the microwave input signal $B \cos \omega_0 t$, introduces a phase lag of 90°, and supplies an output signal $B \sin \omega_0 t$. This output voltage is fed directly to balanced mixer 54.

As mentioned hereinbefore balanced mixer 52 is identical to balanced mixer 54 and accepts the voltage signals $A \cos \omega_1 t$ and voltages $B \cos \omega_0 t$, combines the two voltages and produces an output voltage signal $AB \cos \omega_0 t \cos \omega_1 t$ which is fed directly to magic tee 60. In a similar manner balanced mixer 54 accepts input signals $A \sin \omega_0 t$ and $B \sin \omega_1 t$ combines the two and produces an output voltage signal $AB \sin \omega_0 t \sin \omega_1 t$. This voltage is applied to a conventional phase shifter 55 which shifts it in phase 180° and provides an output voltage represented by $-AB \sin \omega_0 t \sin \omega_1 t$. This output voltage is fed directly to magic tee 60.

Magic tee 60 adds voltages $AB \cos \omega_0 t \cos \omega_1 t$ and $-AB \sin \omega_0 t \sin \omega_1 t$ and produces an output voltage of the form $AB(\cos \omega_0 t \cos \omega_1 t - \sin \omega_0 t \sin \omega_1 t)$, which, by the use of trigonometric identities, may be expressed as $AB \cos (\omega_0+\omega_1)t$. Thus the output signal from magic tee 60 has a frequency equal to the sum of the two input frequencies. To put it another way, the input voltage is shifted upward in frequency by an amount equal to the frequency of the low frequency signal. While this discussion relates to shifting the input voltage upward in frequency, it will be recognized by those skilled in the art that a resultant signal may be produced that is shifted downward in frequency.

The explanation presented hereinbefore as to the operation of frequency offset generator 44 is by way of illustration only. It will be recognized by those skilled in the microwave art that the frequency offset generator taught by Norgaard may be utilized for microwave frequency application by properly selecting the various microwave components and may be employed for broad band operation. In an actual microwave embodiment of the frequency offset generator 44, equal lengths of microwave plumbing paths and the use of a short-slot hybrid device in place of magic tee 56 and phase shifter 58 would be required. Further phase shifter 55 could be eliminated by the proper selection of waveguide. By properly selecting the various microwave components for the frequency offset generator, broad band operation is attained.

Reference will now be made to FIG. 3. The output from the frequency offset generator 44 is applied to the input of travelling wave tube 34' through pad 40', delay line 42' and directional coupler 32', in a manner similar to that as described with reference to FIG. 1. Successive recirculation through the feedback loop provides an output voltage signal of high level, having a wide band power spectrum such as shown in FIG. 2d.

By replacing the narrow band source 30' with a stable microwave oscillator 48 (shown dotted), there will be produced a set of stable microwave frequencies separated by fixed frequency increments such as shown in FIG. 5e. Stable microwave oscillators are generally well-known in the microwave art. One example of the stable microwave oscillator 48 would be a klystron coupled to a resonant cavity, commonly referred to as a "Stalo." The operation of the embodiment illustrated in FIG. 3 utilizing stable microwave oscillator 48 in lieu of narrow band source 30' will produce the wave forms illustrated in FIG. 5.

For illustration purposes the frequency from stable microwave oscillator 48 is in the microwave region and will be assumed to be 9000 mc. The output signal from oscillator 48 is coupled through directional coupler 32' to the input of travelling wave tube 34'. Travelling wave tube 34' amplifies this input voltage and supplies an output voltage having the same frequency as the input to directional coupler 38'. The signal from directional coupler 38' is applied to a utilization device, such as an antenna. In addition, a portion of the output signal from coupler 38' is applied to frequency offset generator 44 included in the feedback loop 39.

Frequency offset generator 44 accepts this signal and a signal from a low frequency oscillator 46 to produce an output voltage at a frequency equal to the sum of the two input frequencies. For example, if the frequency of the voltage from low frequency oscillator 46 is 10 mc. and the frequency supplied to the frequency offset generator 44 from the TWT 34' is 9000 mc., the voltage output from frequency offset generator 44 has a frequency of 9000+10, or 9010 mc. The output signal from frequency offset generator 44 is attenuated in pad 40', delayed in delay line 42', and applied through directional coupler 32' to the input coupling of travelling wave tube 34' in a manner similar to that described in connection with the discussion of FIG. 1. After one cycle of recirculation, the input to travelling wave tube 34 consists of two signals having discrete frequencies $f_1$ and $f_1+f_2$, as shown in FIG. 5b. After a second cycle of recirculation through the feedback loop comprising FOG 44, pad 40', and delay line 42', the input signals to travelling wave tube 34' will consist of three discrete frequencies, $f_1$, $f_1+f_2$, and $f_1+2f_2$, as shown in FIG. 5c. As explained in conjunction with FIG. 1, the inputs shown in FIGS. 5a, 5b and 5c represent transient conditions. After many cycles of recirculation, the input signal to travelling wave tube 34' would appear as shown in FIG. 5d. The output consists of discrete frequency signals which are, within the spectrum, separated by a constant amount. As seen in FIG. 5e, these signals have the appearance of a comb, giving rise to the term "comb oscillator" to describe the steady-state output spectrum of the embodiment of FIG. 3.

While particular embodiments of the invention have been shown and described herein, it is not intended that the invention be limited to such disclosure, but that changes and modifications can be made and incorporated within the scope of the claims.

What is claimed is:

1. A microwave frequency spectrum expander comprising a travelling wave tube having input and output coupling means, means for applying a microwave frequency signal to the input coupling means, recirculating means coupled to the input and output coupling means of said travelling wave tube for feeding back a portion of the output signal from said travelling wave tube, said recirculating means comprising a frequency offset generator.

2. A system for generating a spectrum of high level, discrete frequency signals that are separated by fixed frequency increments from a discrete frequency microwave signal comprising a travelling wave tube for amplifying the microwave signal, and recirculating means including a frequency offset generator for applying a portion of the amplified signal to the travelling wave tube, whereby there is produced a spectrum of high level discrete frequency signals.

3. A microwave frequency spectrum expander comprising a travelling wave tube to amplify a microwave frequency signal and produce a first output signal, said travelling wave tube having input coupling means and an output coupling means, first means for applying a microwave frequency signal to said input coupling means, second coupling means for accepting said first output signal from said output coupling means, frequency offset generator means for accepting a portion of said first output signal from said second coupling means, said frequency offset generator means producing a second output signal having a frequency different from said first output signal, and means for applying said second output signal to said travelling wave tube such that there is produced a microwave signal having an expanded frequency spectrum.

References Cited in the file of this patent

UNITED STATES PATENTS

| 2,593,113 | Cutler | Apr. 15, 1952 |
| 2,619,543 | Cutler | Nov. 25, 1952 |
| 2,927,280 | Cumming | Mar. 1, 1960 |